Feb. 8, 1955  M. S. HALLSTROM  2,701,649
HYDRAULIC POLE JAMMER
Filed Aug. 3, 1951  6 Sheets-Sheet 1

INVENTOR.
MATT S. HALLSTROM,
BY
McMorrow, Berman + Davidson
ATTORNEYS

Feb. 8, 1955

M. S. HALLSTROM 2,701,649

HYDRAULIC POLE JAMMER

Filed Aug. 3, 1951

INVENTOR
MATT S. HALLSTROM,

BY McMorrow, Berman & Davidson
ATTORNEYS

Feb. 8, 1955 M. S. HALLSTROM 2,701,649
HYDRAULIC POLE JAMMER

Filed Aug. 3, 1951 6 Sheets-Sheet 3

INVENTOR
MATT S. HALLSTROM,

BY
McMorrow, Berman + Davidson
ATTORNEYS

Feb. 8, 1955  M. S. HALLSTROM  2,701,649
HYDRAULIC POLE JAMMER
Filed Aug. 3, 1951  6 Sheets-Sheet 4
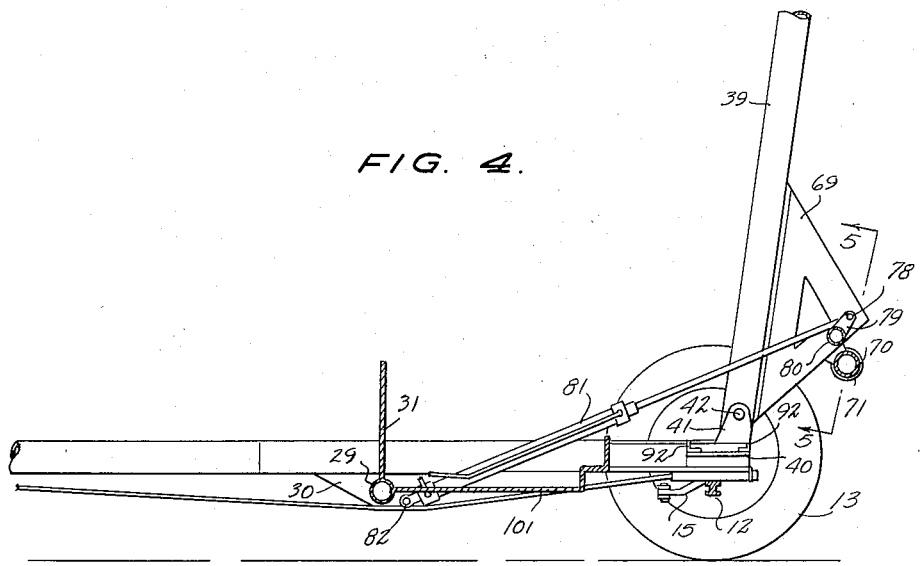
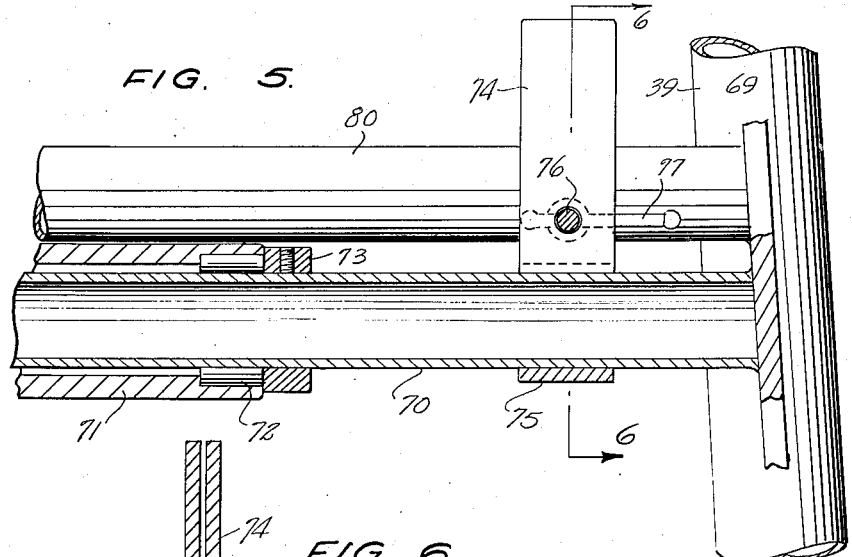
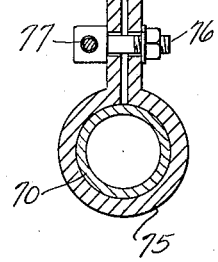
INVENTOR
MATT S. HALLSTROM,
BY
McMorrow, Berman + Davidson
ATTORNEYS Feb. 8, 1955 M. S. HALLSTROM 2,701,649
HYDRAULIC POLE JAMMER
Filed Aug. 3, 1951 6 Sheets-Sheet 5

INVENTOR
MATT S. HALLSTROM,

BY
McMorrow, Berman & Davidson
ATTORNEYS

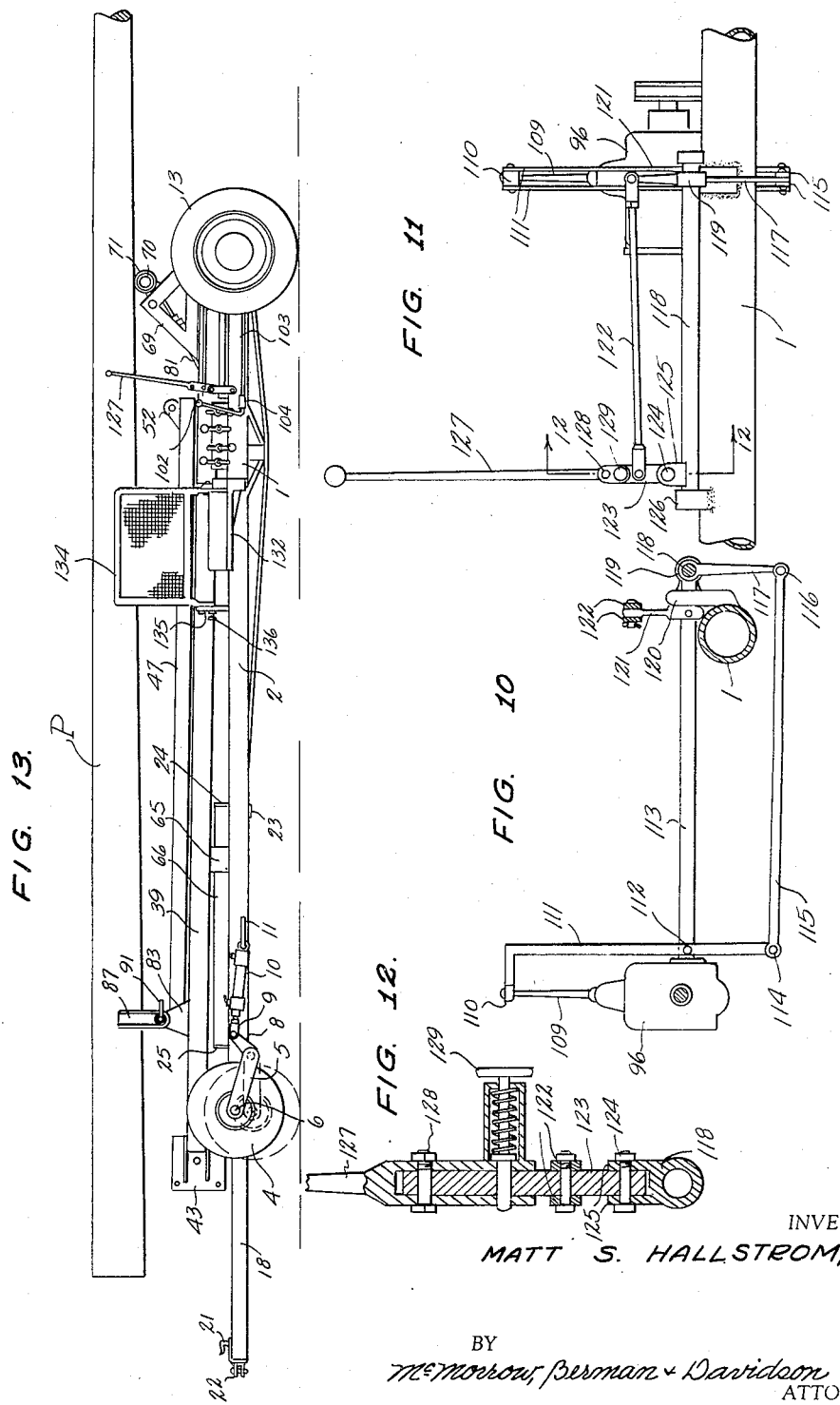

United States Patent Office 2,701,649
Patented Feb. 8, 1955

2,701,649

HYDRAULIC POLE JAMMER

Matt S. Hallstrom, Chatham, Mich.

Application August 3, 1951, Serial No. 240,245

3 Claims. (Cl. 214—3)

This invention relates to a hydraulic pole jammer. More particularly, the invention has reference to a wheeled trailer capable of being drawn by an ordinary truck, and adapted for the loading on said trailer of line poles, such as used by power or telephone companies, the transportation of said poles to the site of erection, the elevation of said poles into position over the post holes in which they are to be erected, and the lowering of the poles into the holes.

Conventionally, the transportation of line poles to the site of erection thereof and the setting of the poles in the holes dug therefor have been carried out by use of conventional line trucks, which are ordinarily equipped with a winch and a tripod for pole-setting operations. Most usually, a trailer is also needed to haul the pole to the site.

The loading of the poles upon the trailer has heretofore been carried out only with the expenditure of a substantial amount of time and labor. Additionally, after the poles have been distributed to the proper sites, it has been necessary, at each of said sites, to set up the tripod, a task carried out with considerable difficulty, due to the weight of the tripod pipes, it being quite common that the setting up of a tripod will involve the labor of three men, as well as the expenditure of an excessive amount of time.

In view of the above, if only a few poles are to be set, it has often been found easier to "pike" or set the poles by hand rather than expend the time and trouble of setting up the heavy tripod pipes.

Additionally, a conventionally equipped line truck is awkward to maneuver, and is of heavy weight, thus making the use of the truck in soft ground impossible. Still further, in many instances ditches must be crossed, since most power lines are built on the edge of a road right-of-way. Thus, it becomes necessary to move the truck across the ditch in order that it may be properly positioned to set the pole in its hole.

In view of the problems encountered, it is the main object of the present invention to provide a wheeled trailer readily attachable to a line truck, and so equipped as to permit the loading of a pole thereon, the setting up of a tripod, and the elevation of the pole over the hole, as well as the lowering of the pole into the hole, to be carried out by hydraulic means, with a speed and facility which has not heretofore been possible in equipment of this type.

Another important object is to provide a trailer of the character described so designed as to be readily moved off the road right-of-way, across ditches or soft ground, without necessity of moving the traction vehicle from the road.

Still another object is to provide a structure of the character described that will be adapted not only for pole hauling and setting, but also for hoisting operations, such as the hoisting of transformers, regulators, and other equipment, used in power line work.

Referring to the drawings:

Figure 2a is a continuation of Figure 2, showing the front end of the structure;

Figure 4 is a longitudinal sectional view through the rear end portion of the structure, some portions being partially broken away and other portions not being shown;

Figure 5 is an enlarged detail section taken substantially on line 5—5 of Figure 4;

Figure 6 is a sectional view taken substantially on line 6—6 of Figure 5;

Figure 10 is a section on line 10—10 of Figure 3, illustrating details of the power transmission linkage;

Figure 11 is a side elevational view of said power transmission linkage taken from the right of Figure 10;

Figure 12 is an enlarged detail section taken on line 12—12 of Figure 11;

Figure 13 is a side elevational view of the over-all structure, the boom being shown in lowered condition, a pole supported upon said structure being illustrated fragmentarily;

Figure 14 is a diagrammatic representation of the hydraulic system embodied in the invention; and Figure 15 is an enlarged fragmentary perspective view of the pole lifting assembly.

Figure 1:
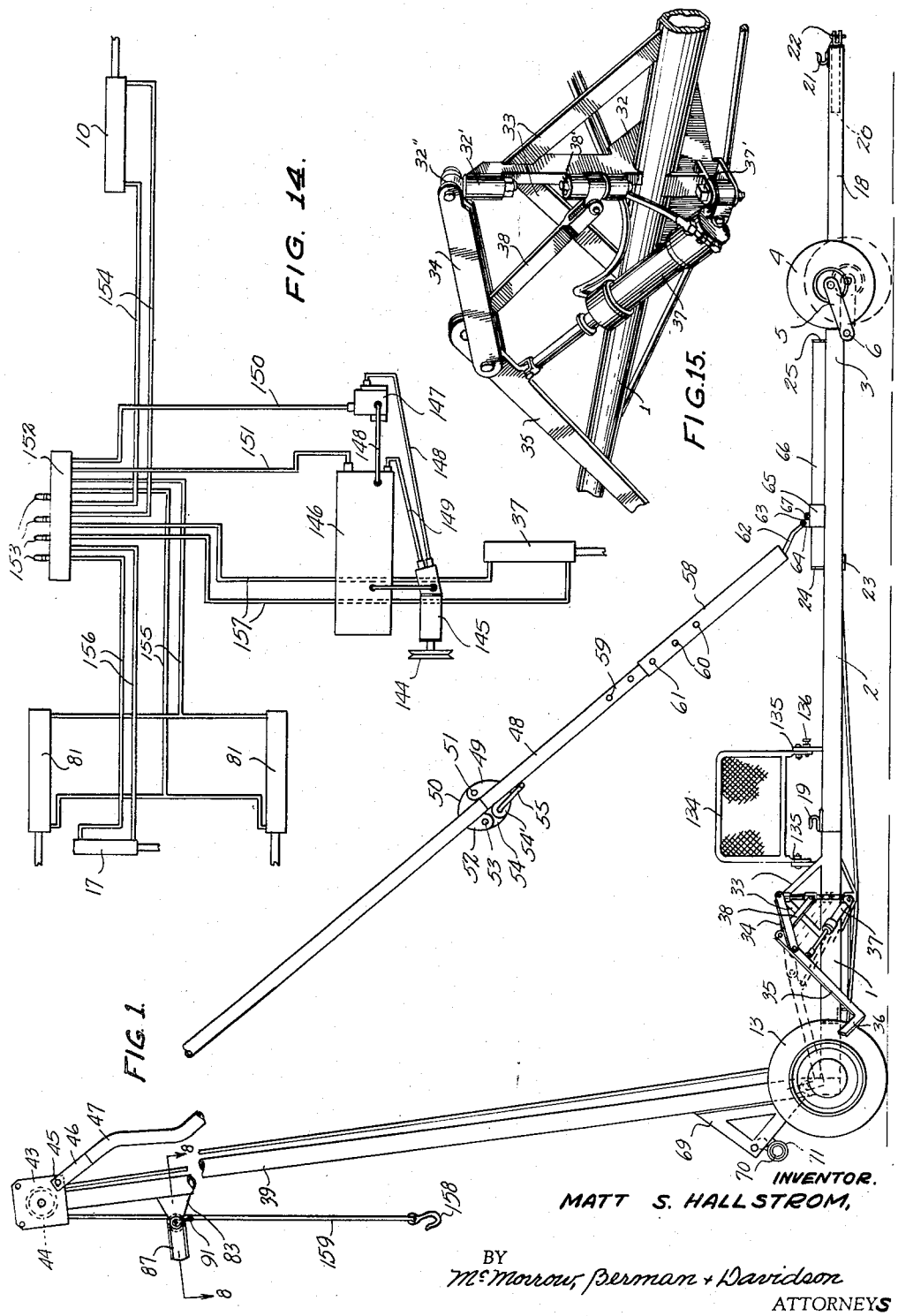
Figure 1 is a side elevational view of the structure formed in accordance with the present invention, portions being broken away partially, and other portions not being shown, a boom embodied in the structure being illustrated in raised position.

Referring to the drawings in detail, to promote a clearer understanding of the invention, the description hereinafter provided will take up in regular order the several component assemblies that make up the over-all structure. These are the main frame, the front and rear wheel assemblies, a hitch assembly, the pole-loading mechanism, the boom or tripod assembly, the power means and transmission, and the hydraulic system.

Considering first the main frame, this includes a pair of elongated, horizontally extended, tubular members having parallel rear portions 1 extending along opposite sides of the structure, said rear portions merging at their front ends into forwardly converging medial portions 2, which in turn merge at their front ends into parallel, closely spaced front portions 3.

Referring now to the front and rear wheel assemblies, the front wheel assembly is best illustrated in Figures 2a and 13. Said assembly includes a pair of front wheels 4 disposed at opposite sides of the structure slightly forward of the main frame, each of said front wheels being rotatably mounted upon a vertically swingable fork 5. The respective forks 5 are rigid with opposite ends of a shaft 6 rotatably mounted in bearings 7 carried by the front end of the main frame.

For the purpose of swinging the forks 5 jointly through a vertical plane, a radial arm 8 is rigidly secured to one end of the shaft 6, said arm being pivotally connected at its outer end to the piston or ram 9 of a hydraulic cylinder 10 pivotally connected to a plate 11 welded or otherwise rigidly secured to and extending laterally from one of the forward end portions 3 of the main frame.

The rear wheel assembly includes an axle 12 of dropped-center construction secured rigidly to and below the rear end of the main frame, and extending transversely of said main frame. The axle 12 is adapted to support at opposite ends thereof the rear wheels 13, said wheels being mounted for hydraulic steering thereof. To this end the rear wheels are rotatably mounted upon spindles pivotally mounted upon the ends of the axle 12, as at 14, said spindles being rigid with steering knuckle arms 15 connected (see Figure 3) by a tie rod 16 that is pivotally connected to the piston of a hydraulic steering mechanism, generally designated 17, for reciprocation thereby, the cylinder of said mechanism being connected pivotally to the main frame.

It will be understood that ordinarily during the transportation of the poles to the site, the rear wheels 13 may be locked against steering. However, when the trailer is being moved off the roadway, it becomes desirable in many instances to steer the rear wheels, to position the trailer accurately relative to a hole in which a pole is to be set. The use of a hydraulic steering mechanism makes easier this task, as will be readily appreciated.

The hitch assembly embodied in the invention includes a pair of elongated, parallel, horizontally disposed tubes or pipes 18 rigidly connected in side-by-side relation in any suitable manner. As may be noted from Figures 2 and 2a, said pipes are disposed longitudinally and centrally of the main frame, projecting forwardly beyond the front end of the main frame a substantial distance.

Figure 2:
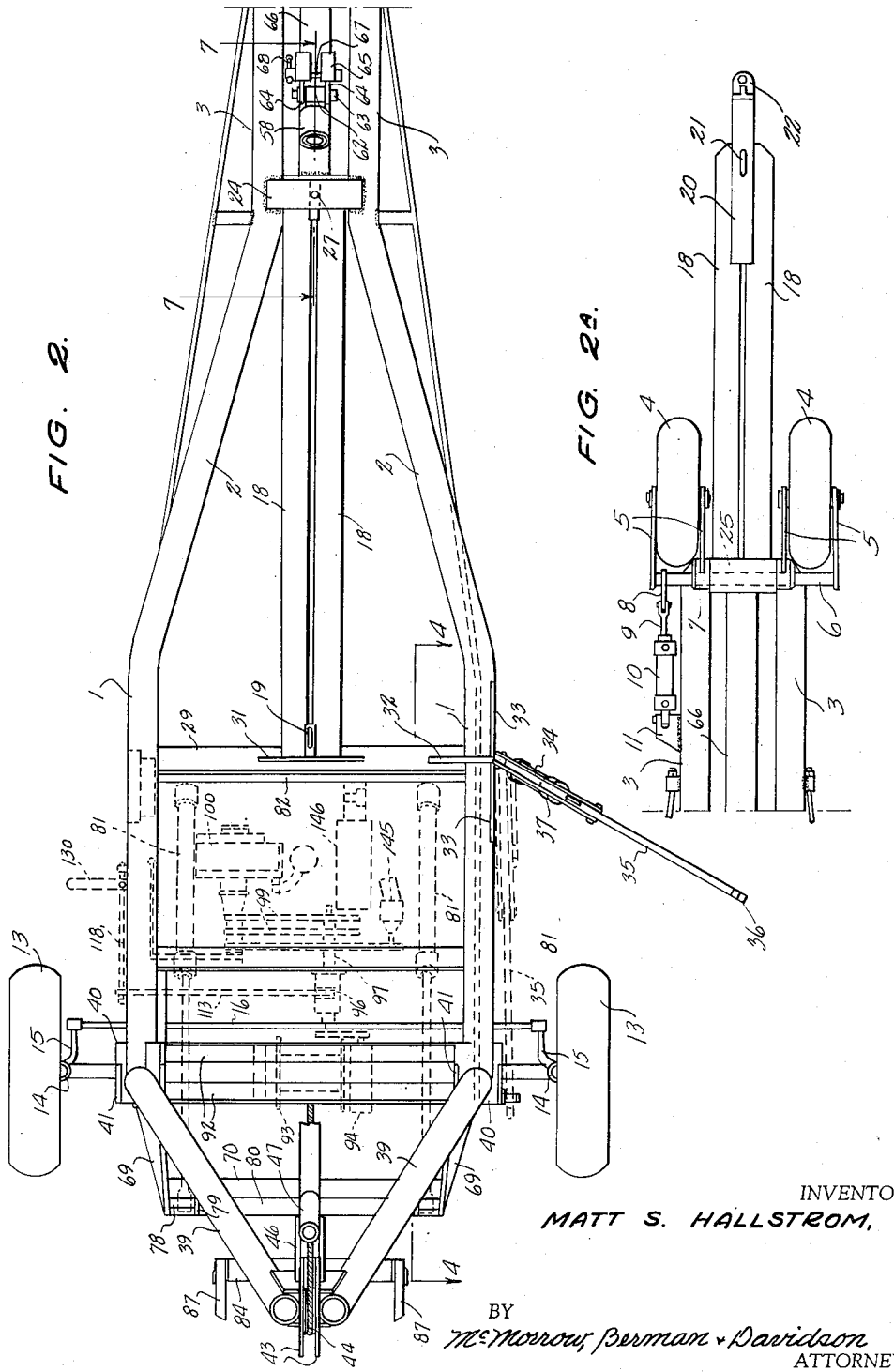
Figure 2 is a top plan view, the boom being in raised position.

At their rear ends, the pipes or tubes 18 are provided with a hook 19, this being for the purpose of permitting a winch cable to be connected to the rear ends of the hitch tubes, for the purpose of slidably adjusting said hitch tubes relative to the main frame, to the right in Figures 2 and 2a, thereby to extend the over-all length of the structure. This may be desirable on account of the length of the particular poles being carried by said structure, and may also be desirable in the light of the particular distance which may exist between a hole in which a pole is to be set and the truck or other traction vehicle to be left upon the adjacent roadway.

At their front ends, the tubes 18 have rigidly secured thereto an I beam 20 projecting beyond the front ends of the tubes, and equipped with a pull-back hook 21 and a clevis 22. The hook 21 is for the purpose of attaching a winch cable for retraction of the hitch tubes to the position thereof seen in Figures 2 and 2a. The attachment of the winch cable to either of the hooks 19 or 21 will be described in greater detail thereafter.

By means of the clevis 22, the wheeled structure forming the present invention may be attached to the rear end of a truck or other traction vehicle, not shown.

As mentioned above, the hitch tubes 18 are mounted upon the main frame to slide longitudinally thereof, and for the purpose of providing said slidable mounting one or more plates 23 may be rigidly secured to the respective sides of the main frame to extend transversely thereacross, the tubes being mounted to slide upon said plates 23.

Overlying the hitch tubes 18 are angle plates 24 and 25 spaced longitudinally of the main frame at the front end of the main frame and rigidly secured, as by welding or equivalent means, to said main frame.

Figure 7:
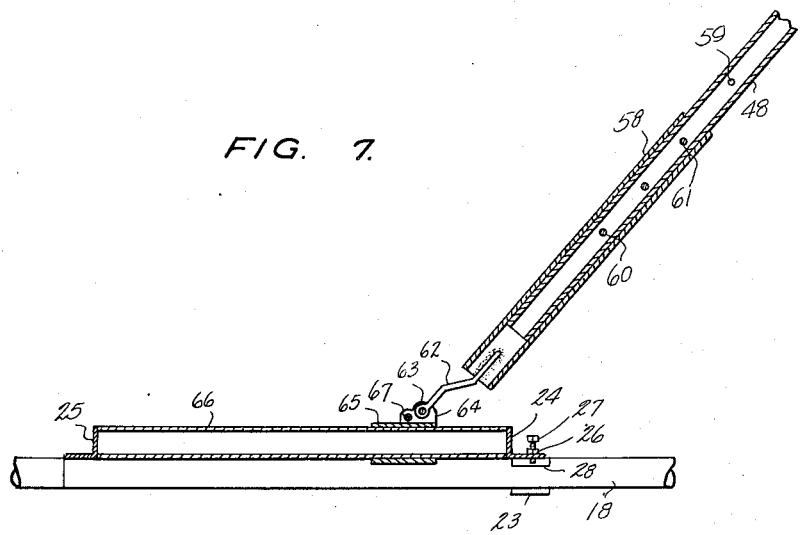
Figure 7 is a section taken substantially on line 7—7 of Figure 2.

It is desirable that the hitch tubes 18 be fixedly clamped against movement relative to the main frame in any position to which said hitch tubes are adjusted longitudinally of the main frame. To this end, I provide (Figure 7) a nut 26 fixedly secured to the angle plate 24, a clamping bolt 27 being threaded in said nut through a suitable opening formed in the angle plate. Below the angle plate a short bar 28 of circular cross-section is disposed between the tubes 18, said bar 28 having a smooth walled recess in its top surface receiving the lower end of the clamping bolt 27.

The bar 28, in this connection, acts as a wedge member. When the bolt 27 is threaded downwardly through the nut 26, it forces the wedging bar 28 inwardly, so as to wedge said bar tightly between the tubes 18, thus to prevent movement of the tubes 18 longitudinally of the main frame. Rotation of the clamping bolt 27 in an opposite direction, of course, eliminates said wedging engagement, freeing the tubes for adjustment longitudinally of the main frame in either direction.

Limiting longitudinal adjustment of the hitch tubes 18 to the left in Figure 2 is a stop means which includes the crossbar 29 extending transversely of the radial portion of the main frame, said bar being disposed below the plane of the main frame and being rigidly secured at opposite ends to depending plates 30 and secured to the respective sides of said main frame (Figure 4). Disposed centrally between opposite sides of the main frame is an upstanding plate 31 rigidly secured to the intermediate portion of the crossbar 29. The plate 31 constitutes a rest for a foldable boom leg to be described hereinafter, when said boom is lowered to the position of Figure 13. Additionally, the plate 31 constitutes a stop limiting movement of the hitch tubes 18 to the left in Figure 2.

A means is embodied in the structure for lifting a pole P from the ground surface onto the structure for transportation of said pole to the site at which the pole is to be erected. This means, constituting a pole-lifting assembly, is believed to be best illustrated in Figures 1 and 2. The assembly includes an upstanding plate 32 rigidly secured to one side of the main frame, said plate being braced in vertical position by angular braces 33 that are also rigidly secured to the main frame, as well as to the plate 32.

A vertically disposed bearing 32' is rigidly mounted upon the upper end of a plate 32, and journaled in said bearing for rotation on a vertical axis is a pivot shaft 32" to the upper end of which is pivotally connected outwardly extended fork arms 34. It will thus be seen that on rotation of the pivot shaft in its bearing, the fork arms 34 will swing between the dotted line and the full line positions thereof illustrated in Figure 2. Further, the pivotal connection of said arms to the upper end of the pivot shaft permits the arms to swing upwardly and downwardly in a vertical plane.

Pivotally connected to the outer ends of the fork arms 34 is an extension arm 35. The connection of the extension arm 35 to the fork arms is located intermediate opposite ends of the extension arm, and the extension arm is integrally or otherwise rigidly formed at its outer end with the laterally extended shoe 36.

Pivotally connected to the extension arm 35 at a location between the shoe 36 and the connection of the arm 35 to the arms 34 is a piston slidable in a hydraulic cylinder 37 that is pivotally connected at its lower end to a vertically disposed pivot pin 37' carried by the lower end of the plate 32.

To the inner end of the extension 35 is pivotally connected a brace 38 connected at its other end to a vertically disposed pivot pin 38 carried by the intermediate portion of the plate 32.

By reason of the construction illustrated and described, in one position of the pole-lifting mechanism, the shoe 36 will be disposed upon the ground or other supporting surface, and the pole P may be rolled directly upon said shoe. In this connection, the shoe will be so disposed as to engage under the middle portion of the pole, so that the pole may be readily balanced while being lifted onto the structure.

After the pole has been positioned in this manner, the hydraulic cylinder acts, when fluid under pressure is supplied thereto, to elevate the extension arm 35, with the pole supported thereon, the arm swinging upwardly. Said arm is adapted to swing upwardly until it is disposed fully horizontally and in alignment with the fork arms 34, which will also be horizontally disposed. The pole may now be rolled onto the trailer, so as to be transported to the site at which the pole is to be erected. A plurality of poles may be lifted in turn in this manner to be supported upon the trailer.

Referring now to the boom construction, a pair of elongated, tubular boom arms 39 are disposed in outwardly converging relationship, as best seen from Figure 2.

The boom arms are pivotally connected at their lower ends to the rear ends of the main frame members to swing in a vertical plane between a horizontal position thereof, as seen in Figure 13, and an upwardly extended position, as seen in Figure 1.

Figure 3:
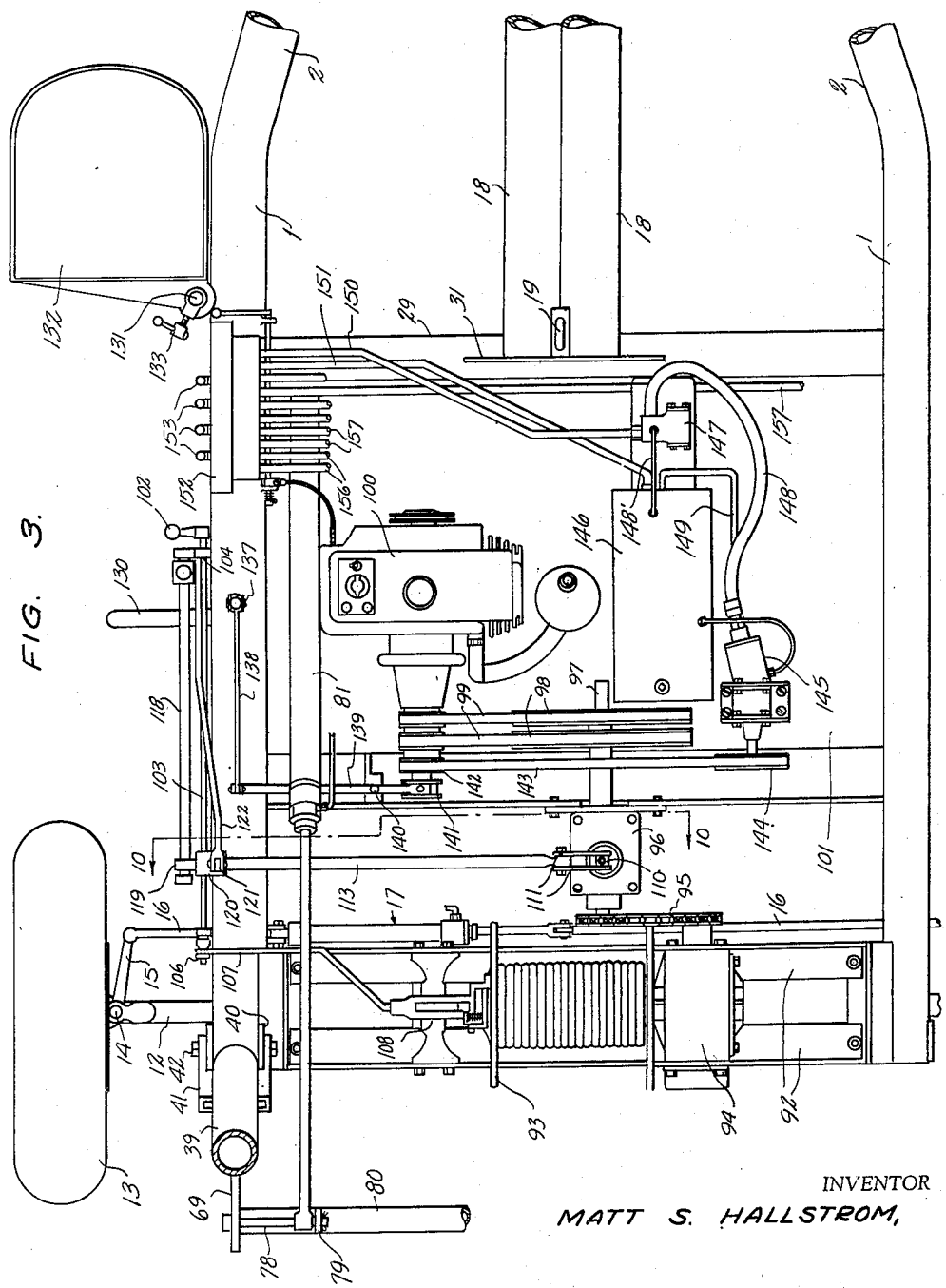
Figure 3 is an enlarged plan section of the rear end portion of the structure, portions being broken away.

The pivotal connection of the boom arms to the main frame is best illustrated in Figures 3 and 4, and includes a box-like supporting means mounted rigidly upon the rear ends of the main frame members, said supporting means being designated 40 and including upstanding ears 41 embracing the lower ends of the boom arms. A hitch pin 42 passes through each pair of ears and the associated boom arm.

At the upper ends of the boom arms, said arms have rigidly secured thereto spaced, parallel plates 43 between which is rotatably mounted a sheave 44. To the lower corners of the plates 43 there are pivotally connected, as at 45, a pair of spaced plate members 46. These are rigidly secured at their lower ends to the upper end of an upper boom leg section 47, the section 47 being connected at its other end to a lower leg section 48, so that said sections cooperate to provide an elongated boom leg defining, with the boom arms 39, a tripod.

Figure 9:
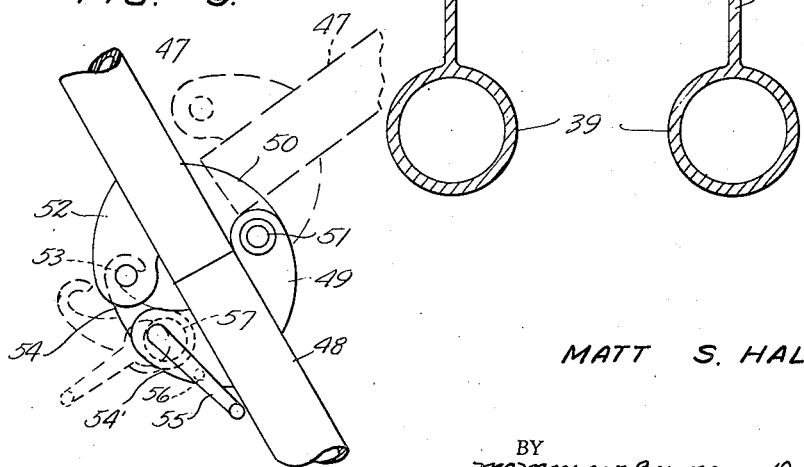
Figure 9 is a fragmentary side elevational view of the medial portion of the tripod leg, showing details of a hinged connection between the sections comprising said leg.

The leg sections 47 and 48 are so connected as to be folded into side-by-side, longitudinally contacting relation. The connection of said leg sections to one another is best illustrated in Figure 9. The leg section 48, in this connection, has rigidly secured thereto spaced, parallel ears 49 between which extends a hinge plate 50 secured rigidly to the leg section 47. A hinge pin 51 is carried by the ears 49 and extends through the hinge plate 50 for permanently and hingedly connecting the leg sections to one another.

Secured fixedly to the leg section 47 and disposed diametrically opposite the hinge plate 50 are spaced lock plates 52, between which extends the lock pin 53. The lock pin is adapted to be releasably engaged by a hook 54 carried by the leg section 48. The hook 54 is disposed between hook support plates 54' secured rigidly to the leg section 48, and disposed diametrically opposite the ears 49 of the leg section 48. A crank 55 has its shaft extending transversely between and rotatably journaled in the respective plates 54', and when the crank is in the full line position illustrated in Figure 9, it is releasably locked in said position by a suitable detent 56.

Rigid with the shaft of the crank 55 is an eccentric 57 on which the hook 54 is rotatably mounted.

By reason of the construction illustrated, it may be noted that when the crank is in the full line position of Figure 9, the hook 54 is lockably engaged by the lock pin 53.

When, however, the crank 55 is rotated to the dotted line position thereof shown in Figure 9, the eccentric will be rotated so as to shift the hook 54 out of engagement with the lock pin, so that the hook may be swung to the dotted line position thereof.

From the description provided above, it will be apparent that when the leg sections are extended, as in Figure 1, they may be locked rigidly in longitudinally aligned position by means of the boom lock illustrated in Figure 9. When, however, the boom is lowered, the boom lock is readily disengaged, so that the upper leg section may be swung pivotally relative to the lower leg section, and collapsed thereagainst in a substantially horizontal position.

In accordance with the invention, the lower leg section is of telescopic construction. To this end, a pipe member 58 slidably receives the lower end of the leg section 48, said leg sections and pipe member being respectively formed with registrable longitudinally spaced openings 59 and 60, respectively. A cross pin 61 may be inserted in any of the registering openings, so as to hold the leg sections and pipe member against relative movement from selected positions of longitudinal adjustment.

Ordinarily, the leg section 48 would not be adjusted longitudinally of the pipe member 58, since ordinary adjustments as to the angle at which the tripod leans are effected by a slidable mounting of the lower end of the tripod leg. This slidable mounting will be described hereafter. However, under one circumstance, namely, the positioning of the tripod at an extreme leaning angle, it might be desired to effect suitable adjustment of the leg section 48 relative to the member 58.

Under this circumstance, the boom arms are disconnected from the hydraulic elevating means associated therewith and to be described hereinafter, and the boom leg is extended by adjustment of the leg section 48 relative to the member 58.

Rigidly secured to the lower end of the pipe member 58 is a connecting plate 62 pivotally connected, as at 63, to and between spaced ears 64 rigidly mounted upon a short sleeve 65 receiving and slidable longitudinally of an elongated sleeve 66 that is rigidly secured at opposite ends to the angle plates 24 and 25.

Thus, the boom leg comprising the sections 47, 48 and 58 is pivotally and slidably connected at its lower end to the main frame.

For the purpose of clamping the foldable boom leg against movement from any position to which it may be adjusted longitudinally of the sleeve 66, a means is associated therewith adapted for binding the sleeve 65 tightly against the sleeve 66. To this end, the sleeve 65 is of longitudinally split formation, the ears 64 extending upwardly therefrom at opposite sides of the split portion of said sleeve. A clamp bolt 67 is then extended between the ears 64, so that said ears 64 can be adjusted transversely of the sleeve 66 toward and away from one another, thereby to bind the sleeve 65 against the sleeve 66 whenever desired.

For ease of operation, the clamping bolt 67 is provided (Figure 2) with an operating handle 68.

On the boom arms 39, spaced pole-supporting bunks are mounted, each of which will be described in turn. A rear bunk assembly is disposed adjacent the bases of the boom arms, and includes triangular supporting plates 69 rigidly secured to the respective arms 39. As particularly well shown in Figure 5, there is extended between the respective plates 69 a rear bunk member 70 rigidly secured at opposite ends to the plates 69, and extending transversely of the boom for the purpose of supporting one end of the pole P being transported to a site at which it is to be erected. Intermediate opposite ends of the member 70, a roller 71 is rotatably mounted thereon, and it is preferred that an anti-friction means be interposed between the roller and the fixed member 70 in the form of a roller bearing 72, thus to assure free rotation of the roller despite the heavy weight of a pole P supported thereon. The roller is effective to permit a plurality of poles P to be slid forwardly or rearwardly upon the bunk so that the butts thereof may be even and flush with one another when the poles are loaded on the trailer. Also, the roller is used for passage of a cable thereover for passage to hooks 19 and 21 when the hitch tubes 18 are extended or retracted.

To prevent the roller 71 from shifting endwise in the member 70, set collars are adjustably clamped to the member 70, abutting against opposite ends of the roller 71.

For the purpose of preventing the poles from rolling transversely off the bunk, spaced stakes 74 are mounted upon the end portions of the bunk member 70. The construction and arrangement of the stakes 74 are best illustrated in Figures 5 and 6. Each stake is formed from a single piece of bar material, the intermediate portion of which is formed to circular cross-sectional shape, so as to embrace the bunk member 70. The end portions of the stakes are disposed in face-to-face contact, as seen in Figure 6, and are formed with registering openings through which extends a clamping screw 76. A handle 77 extends through the head of the clamping bolt or screw, so that the screw can be readily rotated for the purpose of binding the circular intermediate portions 75 of the stakes against the fixed member 70 in selected positions of adjustment of the stakes transversely of the boom.

Thus, the stakes 74 can be adjusted so as to be spaced closely from one another, this being desirable when a single pole is being transported. Depending upon the number of poles to be transported, the stakes can be adjusted away from each other in selected positions, so as to prevent deviation of the poles laterally of the trailer during movement of the trailer to the site, at which the poles are to be set.

Extending inwardly from the respective plates 69 (see Figure 3) are pins 78 supported at their inner ends by brackets 79 that are rigidly secured to and extend upwardly from the cross brace 80. The cross brace 80 is fixedly connected at opposite ends to, and extends transversely between, the respective plates 69. The pistons of spaced hydraulic cylinders 81 are pivotally connected to the pins 78. Thus, when said pistons are forced out of the cylinders under the pressure of fluid supplied to the cylinders, the boom will be forced to the upstanding position thereof illustrated, for example, in Figure 4. When, however, the pistons are retracted into the cylinders, the boom arms 39 are swung downwardly to the horizontal position thereof seen in Figure 13.

The cylinders 81, in this connection, are pivotally connected at their lower ends to the rod 82 extending transversely between and fixedly secured to the depending plates 30 of the main frame.

Figure 8:
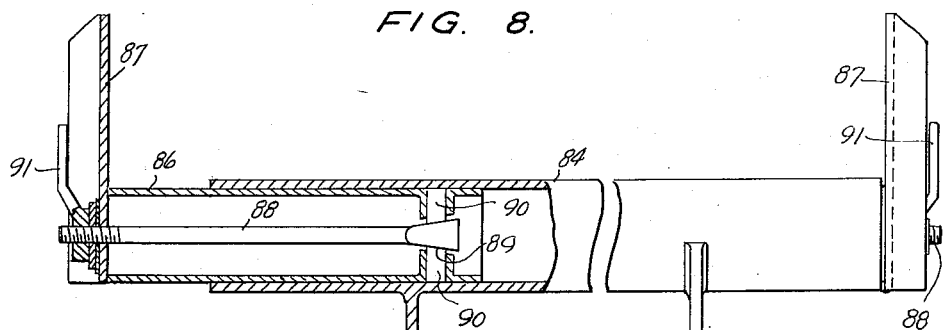
Figure 8 is a sectional view taken transversely through the upper end of the boom, showing details of the front pole bunk.

Considering now the front bunk assembly, reference should be had to Figure 8. As seen from this figure, supporting plates 83 are rigidly secured to the converging end portions of the boom arms 39, and rigidly connected to the plates 83 is a sleeve 84 extending transversely of the boom arms. Sliding in each end of the sleeves is an extension sleeve 86 having rigidly secured thereto a stake 87, the stakes 87 being adapted to support the front end portions of one or more poles P therebetween.

Arranged coaxially of each telescoping sleeve 86 is a clamping rod 88 mounted to slide in the sleeve 86 for the purpose of fixedly clamping the sleeve 86 against movement relative to the sleeve 84 in selected positions of adjustment. To effect the desired clamping engagement, the inner end of the clamping rod 88 is of wedge shape, as at 89, and the wedge-shaped inner end of the rod is adapted to shift a pair of diametrically opposed wedges 90 radially of and against the wall of the outer sleeve 84. The wedges 90 are carried by the inner sleeve 86, as readily seen from Figure 8.

On the outer end of the clamping rod 88 I provide a handle 91 welded to a nut threadably engaged with the end of the clamping rod, which is slidable in a smooth-walled opening formed in the outer end of the inner sleeve.

Thus, on rotation of handle 91 in one direction, the rod 88 will be shifted longitudinally of, but will not rotate relative to the telescoping sleeve, so as to bind wedges 90 against the outer sleeve, thereby to hold these sleeves against relative movement from selected positions of adjustment. When the handle is swung in an opposite direction, the wedges are disengaged from their contact with the outer sleeve, so as to permit the inner sleeve to be adjusted longitudinally of the outer sleeve. In this way, the space between the stakes 87, 87 is adjusted as desired.

The power mechanism embodied in the invention will now be described, and includes a pair of spaced angles 92 extending transversely of the rear end of the main frame and rigidly secured to said main frame. The angles 92 constitute a supporting frame for a winch 93 disposed midway between opposite sides of the main frame and the rear end thereof. A worm drive mechanism of conventional construction is designated 94 and is mounted upon the winch frame adjacent one side thereof. All this construction is best illustrated in Figure 3, and as may be noted from this figure, the worm drive mechanism is driven by a chain 95 passing around a sprocket mounted upon a shaft extending from the mechanism 94, said chain also passing around a shaft extending from a transmission housing 96. It will be understood that the transmission housing 96 will contain a conventional transmission having three speeds forward and one reverse. Said transmission is powered by a shaft 97 driven by pulleys 98 around which pass belts 99 driven from pulleys provided upon the shaft of an internal combustion engine 100. The engine 100 is mounted upon a plate-like base 101 (Figure 4).

It will be understood that it is desirable that the winch drum not be connected directly to the shaft extending from the worm drive mechanism 94, since this might tend to effect too rapid an operation of the drum, and would otherwise prevent the drum from being under the full control of the operator. Rather, the drum of the winch is rotatably mounted upon the shaft extending from the worm drive mechanism, but is capable of being connected to said shaft to be driven thereby by means of a dog clutch.

The dog clutch is controlled by a dog clutch-operating lever 102 rigid with one end of the rod 103 journaled in bearings provided upon one of the main frame members and extending parallel of said frame member, as seen in Figure 3. At its other end the rod 103 has rigidly secured thereto a radial arm 106, to which is pivotally connected a link 107 connected with one of the clutch members of a conventional dog clutch 108. It will be understood that one of the clutch members is carried by the drum of the winch, while the other member is carried by the shaft extending from the worm drive mechanism 94. Thus, the drum of the winch can be coupled to the shaft to be driven thereby whenever desired.

The power transmission system will now be described. Viewing the transmission housing 96 as it appears in Figure 3, the reverse gear will be disposed at the upper right-hand corner. Then, moving clockwise around the housing, at the other corners are located second gear, high gear and low gear. A shift lever 109 projects upwardly from the housing (Figure 10), and has a ball at its upper end received in a ball socket 110 formed on the end of a lateral extension that is provided upon the upper end of a shifting arm 111 extending downwardly along one side of the transmission housing and pivoted intermediate its ends, as at 112, upon a rock shaft 113, one end of which is journaled in the wall of the transmission housing. At its lower end, the shifting arm 111 is pivotally connected at 114 to the inner end of link 115 extending horizontally and transversely of the main frame. At its outer end the link 115 is pivotally connected at 116 to the lower end of a depending radius arm 117 secured to a rock shaft 118 extending alongside the main frame (Figure 3), and journaled at one end in a bearing 119 that is secured to said side of the main frame.

The other end of the rock shaft 113 is journaled in a bearing 120 carried by the side frame member, and adjacent the bearing 120 a link 121 is pivotally connected to said shaft 113. At its upper end, the link 121 has a pivotal connection to and is disposed between the bifurcated end of a rod 122 which is pivotally joined at its other end (Figure 11) to an intermediate portion of an operating arm 123 that is pivoted at its lower end, as at 124, to the rock shaft 118, the rock shaft having ears 125 through which the pivotal connection 124 passes.

At its other end, the rock shaft 118 is journaled in a bearing 126 also rigid with the side frame member.

The handle 127 extends upwardly from the operating arm 123 and is pivotally connected thereto, as at 128. When the handle 127 is not in use, it may be folded downwardly out of the way. However, when the handle is to be placed in use, it is swung upwardly, as in Figures 11 and 12, and a spring loaded detent 129, mounted upon the lower end of the handle, is positioned through registering openings in the handle and operating arm, respectively, so as to rigidify the connection between the handle and operating arm.

For the convenience of an operator, a footrest 130 is rigidly connected to and extends outwardly and laterally of the main frame. Additionally, a post 131 (Figure 3) extends upwardly from and is rigidly secured to the main frame, said post being received in a socket formed at one corner of an operator's seat 132. A handle 133 is provided on a clamping screw that threads through said socket against the post, so as to hold the operator's seat at any position to which it is pivotally swung.

When not in use, the seat 132 is swung inwardly out of the way.

Additionally, I provide a protective screen 134 (Figure 1) disposed upon the main frame adjacent the operator's seat, said screen having depending legs pivotally joined to upstanding supports 135 that are rigid with the main frame. A detent 136 is adapted to retain the screen 134 in upwardly extended position. When, however, it is desired to fold the screen inwardly, the detent 136 is withdrawn.

Referring now to the hydraulic system embodied in the invention, a pump clutch handle 137 (Figure 3) is pivotally mounted upon the main frame, and is pivotally connected to one end of a link 138, so that said link may be reciprocated upon operation of the clutch handle 137. The handle and link are centered upon frame member 1, so as to be clear of the boom arm 39 when the tripod is lowered. At its other end, link 138 is joined pivotally to one end of a lever 139 fulcrumed intermediate its ends, as at 140, upon the main frame. Lever 139 swings in a horizontal plane, and carries at its other end a fork adapted to shift a clutch 141 mounted upon the shaft of engine 100. Clutch 141 couples to the shaft in an operative driving relationship, a single pulley 142 around which passes a belt 143 extending to a larger pulley 144 mounted upon the end of a hydraulic pump 145. The pump 145 is disposed adjacent a fluid reservoir 146, and also mounted upon the frame adjacent the reservoir is a conventional unloading valve 147.

A line 148 extends from the valve 147 to the pump 145, and a line 148' extends from the valve to the reservoir. Another fluid line 149 communicates between the reservoir and the pump.

To operate the hydraulic pump 145, the power transmission 96 is left in neutral position, after which the clutch 141 is applied, coupling the pump to the engine in an operative driving relationship.

A pair of lines 150 and 151 extends from the unloading valve and the fluid reservoir, respectively, to a control panel 152 which carries four hydraulic valves 153 manually controlled by an operator.

When the pump is driven by the engine, oil is drawn by the pump from the reservoir, and forced into the unloading valve. When all four of the hydraulic valves 153 are closed, the oil or other pressure fluid returns to the reservoir.

However, whenever any of the four valves is open, the fluid is allowed to flow to the appropriate hydraulic cylinder for operating a particular part of the mechanism hereinbefore described. Simultaneously with said flow, the unloading valve closes the path of the fluid to the reservoir, the pump then forcing the fluid to the appropriate cylinder or cylinders.

As shown in Figure 14, a pair of lines is extended to the front wheel-lifting cylinder 10, said lines being designated 154 and being controlled by one of the valves 153. Lines 155 extend to the boom-operating cylinders 81, and lines 156 extend to the rear wheel-steering cylinder 17. Lines 157 extend to the pole-lifting cylinder 37. Each pair of lines, as will be understood, is controlled by a separate one of the hydraulic valves 153.

It is believed advisable at this time to explain in sufficient detail the manner of operation of the power transmission mechanism. Assuming, for example, that it is desired to shift into low gear, to operate the winch at low speed, the handle 127 is first swung outwardly and laterally from the main frame. This partially rotates the rock shaft 118, which in turn causes the depending radius arm 117 to swing inwardly of the main frame, that is, to the left in Figure 10. As a result, the arm 111 swings upon its pivotal connection 112, swinging the power transmission shift lever 109 to the right in Figure 10.

Then, the handle 127 is swung to the right in Figure 11, in a direction extending longitudinally of the main frame. As a result, arm 121 is caused to be swung forwardly, partially rotating the rock shaft 113. This shifts the lever 109 into the low gear corner of the transmission housing.

It is also believed advisable to note at this time the manner in which the winch is used in association with the pull-head and pull-back hooks 19 and 21, respectively.

With the boom lowered, as in Figure 13, and assuming that it is desired to retract the hitch tubes 18, it is merely necessary to extend the winch cable directly from the winch drum and around the roller 71 to the pull-back hook 21. Thereafter, power is applied, and the hitch tubes 18 will be retracted.

If it is desired to extend the hitch, the winch cable is extended around the roller 71, and the sheave 44 with the boom in lowered position, and then back to the hook 19. When power is now applied, the hitch tubes 18 will be extended as desired.

I believe the operation and the important characteristics of the invention will be readily noted. However, it may be advisable to summarize these briefly.

Under the control of an operator, the cylinders 81 are actuated to cause retraction of their associated pistons, and this lowers the main boom arm 39 to the position shown in Figure 13. Of course, the hinge connection between the sections 47 and 48 of the third boom leg will first be unlocked. Said legs, accordingly, will fold one upon the other, so that the entire boom, when collapsed, will be disposed longitudinally of the structure over a distance no greater than the length of the boom arms 39.

When the boom is lowered to this position, the bunks for the pole are automatically disposed in a common horizontal plane for loading of a pole P upon the trailer.

The loading of the pole upon the trailer is readily accomplished by use of the pole-lifting means. As previously noted, the pole is engaged at its middle by the loader shoe 36, after which the cylinder 37 is actuated to swing the loader shoe upwardly until the members 34 and 35 are horizontally positioned. When said members are horizontally positioned, they will be disposed substantially in the plane of the pole-supporting bunks, so that the pole is readily rolled off the pole-lifting mechanism onto said bunks.

The entire operation can be carried out in minimum time, and requires the use of no more than one or two men.

On arrival at the site, the trailer is backed off the roadway to a location at which the rear end of the trailer is disposed adjacent the hole in which the pole is to be set. The pole is now rolled off the bunks. Power is then applied to elevate the boom to the position of Figure 1. A hook 158 carried by the winch cable 159 is fastened to the pole slightly above the center thereof. Power is now applied to the winch and the pole raised so that the butt thereof is above the ground. The machine is then steered above the previously dug hole, and the pole is lowered by operation of the winch, and is readily set into the hole.

Alternatively, if a number of poles are to be spotted at spaced apart locations, the distance between the stakes can be appropriately adjusted, and all of said poles can be loaded upon the trailer. The trailer can then be drawn to each of said sites in turn and the poles deposited at the site by being rolled off the bunks onto the pole-lifting mechanism.

Thereafter, on return to the site, the cable 159 can be hooked to the pole as it lies upon the ground and used to hoist the pole into proper position.

It is believed that it will be readily apparent that the structure formed as illustrated and described above is capable of reducing to a substantial extent the amount of time and labor ordinarily consumed in the transportation, loading and unloading, and setting of poles used by power or telephone companies.

It is also believed apparent that the structure is one which can be readily used for other hoisting operations, such as lifting transformers into place.

With respect to the movement of the trailer over ditches and soft ground, the hydraulic steering apparatus used in connection with the rear wheels is capable of being controlled by one worker, while another worker backs up the truck to which the trailer is connected. Since the rear wheels of the trailer are under full control, the trailer can be readily steered over planks laid across ditches, and can be turned in a small space, so as to be easily located with reference to the hole in which the pole is to be set.

What is claimed is:

1. A structure of the class described including a wheel-supported frame; a boom connected thereto to swing between elevated and lowered positions, said boom comprising a pair of rigid boom arms pivotally connected at one end to the frame, said boom arms converging toward their other ends, an upper boom leg section pivotally connected at one end to the converging ends of the boom arms, a lower boom leg section hingedly connected at one end to the other end of the upper section for collapsing of said sections into longitudinally contacting relation in the lowered boom position, means releasably locking the leg sections in coaxial alignment in the elevated boom position, and a sliding pivotal connection between the other end of the lower leg section and said frame; and hydraulic cylinders interposed between the respective boom arms and the frame for shifting the boom between said elevated and lowered positions.

2. A structure of the character described including a wheel supported frame, a pair of horizontally disposed boom arms arranged in converging spaced relation positioned longitudinally of said frame and connected at the diverging ends to said frame for swinging movement from the horizontal position to a vertical position with respect to said frame, a first pole supporting bunk superimposed upon and extending transversely of said boom arms adjacent said diverging ends of the latter and fixedly carried by said boom arms, a second pole supporting bunk superimposed upon and extending transversely of said boom arms adjacent the converging ends of the latter and fixedly carried by said boom arms, a vertically disposed pole lifting assembly including a pole engaging shoe arranged longitudinally of and on one side of said frame intermediate the ends of said frame and connected to said frame for swinging movement from its longitudinal position to a position transverse of said frame, said shoe being connected to said assembly for swinging up and down movement, and means operatively connected to said boom arms for effecting the swinging movement of the latter.

3. A structure of the character described including a wheel supported frame, a pair of horizontally disposed boom arms arranged in converging spaced relation positioned longitudinally of said frame and connected at the diverging ends to said frame for swinging movement from the horizontal position to a vertical position with respect to said frame, a horizontally disposed collapsible boom leg positioned longitudinally of and on said frame and having one end connected to the converging ends of said boom arms for movement with the latter and having the other end connected to said frame for sliding adjustable longitudinal movement, a first pole supporting bunk superimposed upon and extending transversely of said boom arms adjacent said diverging ends of the latter and fixedly carried by said boom arms, a second pole supporting bunk superimposed upon and extending transversely of said boom arms adjacent the converging ends of the latter and fixedly carried by said boom arms, a vertically disposed pole lifting assembly including a pole engaging shoe arranged longitudinally of and on one side of said frame intermediate the ends of said frame and connected to said frame for swinging movement from its longitudinal position to a position transverse of said frame, said shoe being connected to said assembly for swinging up and down movement, and means operatively connected to said boom arms for effecting the swinging movement of the latter.

References Cited in the file of this patent

UNITED STATES PATENTS

| | | |
|---|---|---|
| 791,151 | King et al. | May 30, 1905 |
| 935,391 | Mohan | Sept. 28, 1909 |
| 1,873,433 | Larsen | Aug. 23, 1932 |
| 1,889,820 | Butts | Dec. 6, 1932 |
| 2,130,117 | Butts | Sept. 13, 1938 |
| 2,181,253 | Willis | Nov. 28, 1939 |
| 2,191,181 | Rogers | Feb. 20, 1940 |
| 2,249,907 | Perkowski | July 22, 1941 |
| 2,281,507 | Le Tourneau | Apr. 28, 1942 |
| 2,560,625 | Boggs | July 17, 1951 |
| 2,591,584 | Moone | Apr. 1, 1952 |
| 2,598,517 | Drott | May 27, 1952 |
| 2,617,547 | Pridy | Nov. 11, 1952 |

FOREIGN PATENTS

| | | |
|---|---|---|
| 113,348 | Australia | June 23, 1941 |